(12) United States Patent
Plaster

(10) Patent No.: US 7,172,300 B2
(45) Date of Patent: Feb. 6, 2007

(54) DRIVER OBSERVATION SYSTEM

(76) Inventor: Morgan Plaster, 1463 Pauger St., Apartment 2, New Orleans, LA (US) 70116

( * ) Notice: Subject to any disclaimer, the term of this patent is extended or adjusted under 35 U.S.C. 154(b) by 180 days.

(21) Appl. No.: 10/856,484

(22) Filed: May 28, 2004

(65) Prior Publication Data

US 2005/0111120 A1    May 26, 2005

Related U.S. Application Data

(63) Continuation-in-part of application No. 10/704,898, filed on Nov. 10, 2003, now Pat. No. 6,935,758.

(51) Int. Cl.
*G02B 5/08*    (2006.01)

(52) U.S. Cl. .................................... 359/850
(58) Field of Classification Search ............... 359/850, 359/857
See application file for complete search history.

(56) References Cited

U.S. PATENT DOCUMENTS

| 1,478,650 A | 12/1923 | Hallengren |
|---|---|---|
| 1,617,270 A | 2/1927 | Paul |
| 1,635,011 A | 7/1927 | Sadler |
| 1,644,902 A | 10/1927 | Voigt |
| 1,649,083 A | 11/1927 | Ruth |
| 1,745,862 A | 2/1930 | O'Rourke |
| 2,103,858 A | 12/1937 | Luschinsky |
| 2,501,067 A | 3/1950 | Lusebrink |
| 3,127,191 A | 3/1964 | Goldman |
| 3,394,978 A | 7/1968 | Muller |
| 3,682,536 A | 8/1972 | Whitman |
| 4,911,673 A | 3/1990 | Hollowell |
| 5,666,227 A | 9/1997 | Ben-Ghiath |
| 6,055,098 A | 4/2000 | Lett |
| 6,250,766 B1 | 6/2001 | Strumolo et al. |
| 6,357,883 B1 | 3/2002 | Strumolo et al. |
| 6,538,827 B2 | 3/2003 | Bos |
| 6,593,960 B1 | 7/2003 | Sugimoto et al. |

FOREIGN PATENT DOCUMENTS

GB      2 221 883 A      2/1990

*Primary Examiner*—Euncha Cherry
(74) *Attorney, Agent, or Firm*—Jeffrey D. Moy; Harry M. Weiss; Weiss & Moy, P.C.

(57) ABSTRACT

A driver observation system for extending the driver's point of vision to the corners of a vehicle by transmitting forward, side and rear light images from camera mirror assemblies at or near the front and rear corners of a vehicle to monitors within the driver's view at the controls of the vehicle. The system is suitable for either front or rear or both front and rear applications, as well as left or right or both left and right and may be installed after factory manufacture of the vehicle or as part of the original manufacture.

18 Claims, 14 Drawing Sheets

DRIVER OBSERVATION SYSTEM

This application is a continuation-in-part of application Ser. No. 10/704,898, filed Nov. 10, 2003 now U.S. Pat. No. 6,935,758.

BACKGROUND OF THE INVENTION

The present invention relates to devices, assemblies and systems for enhancing the observation of a driver of any vehicle by extending the driver's point of vision to the corners of the vehicle by transmitting forward, side, and rear images from the corners of the vehicle to a location within the vision of the driver at the controls of the vehicle.

With the ever increasing number of vehicles on the roads, streets and highways and the increasing number of larger vehicles, such as pick-up trucks, vans and sports utility vehicles, commonly known as SUVs, the ability of the driver of a vehicle, especially smaller vehicles such as sports cars and sedans, to see traffic conditions, whether on the side, in the rear or forward has been diminished. This is particularly so in those conditions where a driver is attempting to turn into an intersecting street, or back out of a parking spot, or trying to turn left from a turning lane across oncoming traffic. In all those instances the driver must extend the vehicle into traffic a sufficient length, usually almost half the length of the vehicle, so that the driver's line of vision covers the oncoming traffic. While most vehicles are equipped with rear view mirrors and there have been attempts to eliminate the "blind spot" behind the driver, the need to extend the driver's line of vision applies in all directions.

Likewise, because so many vehicles are already in use, there is a need to provide an enhancement or extension of the driver's line of vision to existing vehicles as well as those under manufacture. Such an enhancement would have broader application and use if it were relatively small and unobtrusive.

Therefore, it would be clearly advantageous and would improve the safety of a vehicle if the line of vision of the driver were extended to the corners of the vehicle.

SUMMARY OF THE INVENTION

The main object of this invention is to improve safety and avoid accidents by extending the line of vision of a driver of a vehicle to the corners of the vehicle in forward, side and rear directions from corner mounted camera mirror assemblies to the driver's view.

It is a further object of this invention that it be applicable to the front and rear of a vehicle and to the right and left side of a vehicle in any combination.

It is a further object of this invention that it be applicable to existing vehicles as well as vehicles under manufacture and the invention be installed either during manufacture or after and such installation be either internal or external to the body of a vehicle or a combination of both.

It is a further object of this invention that it be a camera device comprising at least one camera transmitting light images to the driver's view, said camera either directly receiving light images or working in combination with a light reflecting surface such as a mirror, with the location, size and configuration of the camera and light reflecting surfaces suitable to the vehicle upon which the invention is installed.

It is a further object of this invention to provide a driver observation system for use with a driver-operated vehicle, said driver observation system comprising; at least one corner camera mirror assembly disposed to receive light images from a front corner of the vehicle with at least one side facing mirror to receive and reflect a light image not within the vision of the driver and a camera to receive said light image reflected from said mirror; transmitting means to communicate said light image from said camera; and a display monitor within the vision of the driver to receive said light image from the transmitting means.

It is a further object of this invention to provide a driver observation system for use with a driver operated vehicle where at least one said side facing mirror at a front corner of the vehicle further comprises a pivotal mount and control means to rotate said side facing mirror to allow the camera to receive a light image not reflected from said mirror, and a display monitor within the vision of the driver to receive the light image not reflected from said mirror from the transmitting means.

It is a further object of this invention to provide a driver observation system for use with a driver operated vehicle, further comprising; at least one corner camera mirror assembly disposed to receive light images from a front corner of the vehicle with a right facing mirror and a left facing mirror to receive and reflect light images not within the vision of the driver and a camera to receive said light images reflected from said mirrors; transmitting means to communicate said light image from said camera; and a display monitor within the vision of the driver to receive said light image from the transmitting means.

It is a further object of this invention to provide a driver observation system for use with a driver operated vehicle, where the right facing mirror and left facing mirror at a front corner of the vehicle further comprises a pivotal mount and control means to rotate either or both of said side facing mirrors to allow the camera to receive a light image not reflected from said mirrors, and a display monitor within the vision of the driver to receive the light image not reflected from said mirrors through the transmitting means.

As an alternative embodiment of this invention it is a further object to provide a driver observation system for use with a driver-operated vehicle, said driver observation system comprising; at least one camera disposed to receive light images from a front corner of the vehicle to receive a light image not within the vision of the driver; pivotal mount and control means to rotate said camera on pivotal mount; transmitting means to communicate said light image from said camera; and a display monitor within the vision of the driver to receive said light image from the transmitting means.

It is a further object of this invention to provide a driver observation system for use with a driver-operated vehicle, said driver observation system comprising; at least one corner camera mirror assembly disposed to receive light images from a rear corner of the vehicle with at least one side facing mirror to receive and reflect a light image not within the vision of the driver and a camera to receive said light image reflected from said mirror; transmitting means to communicate said light image from said camera; and a display monitor within the vision of the driver to receive said light image from the transmitting means.

It is a further object of this invention to provide a driver observation system for use with a driver operated vehicle where at least one said side facing mirror at a rear corner of the vehicle further comprises a pivotal mount and control means to rotate said side facing mirror to allow the camera to receive a light image not reflected from said mirror, and a display monitor within the vision of the driver to receive the light image not reflected from said mirror through the transmitting means.

It is a further object of this invention to provide a driver observation system for use with a driver operated vehicle, further comprising; at least one corner camera mirror assembly disposed to receive light images from a rear corner of the vehicle with a right facing mirror and a left facing mirror to receive and reflect light images not within the vision of the driver and a camera to receive said light images reflected from said mirrors; transmitting means to communicate said light image from said camera; and a display monitor within the vision of the driver to receive said light image from the transmitting means.

It is a further object of this invention to provide a driver observation system for use with a driver operated vehicle, where the right facing mirror and left facing mirror at a rear corner of the vehicle further comprises a pivotal mount and control means to rotate either or both of said side facing mirrors to allow the camera to receive a light image not reflected from said mirrors, and a display monitor within the vision of the driver to receive the light image not reflected from said mirrors through the transmitting means.

As an alternative embodiment of this invention it is a further object to provide a driver observation system for use with a driver-operated vehicle, said driver observation system comprising; at least one camera disposed to receive light images from a rear corner of the vehicle to receive a light image not within the vision of the driver; pivotal mount and control means to rotate said camera on pivotal mount; transmitting means to communicate said light image; and a display monitor within the vision of the driver to receive said light image through the transmitting means.

It is a further object of this invention that the transmitting means not be limited to any one modality but by way of example and not by way of limitation may be one or more wire cables, fiber optic cables or wireless communication between the camera and display monitor.

DETAILED DESCRIPTION OF THE INVENTION

Figure 1:
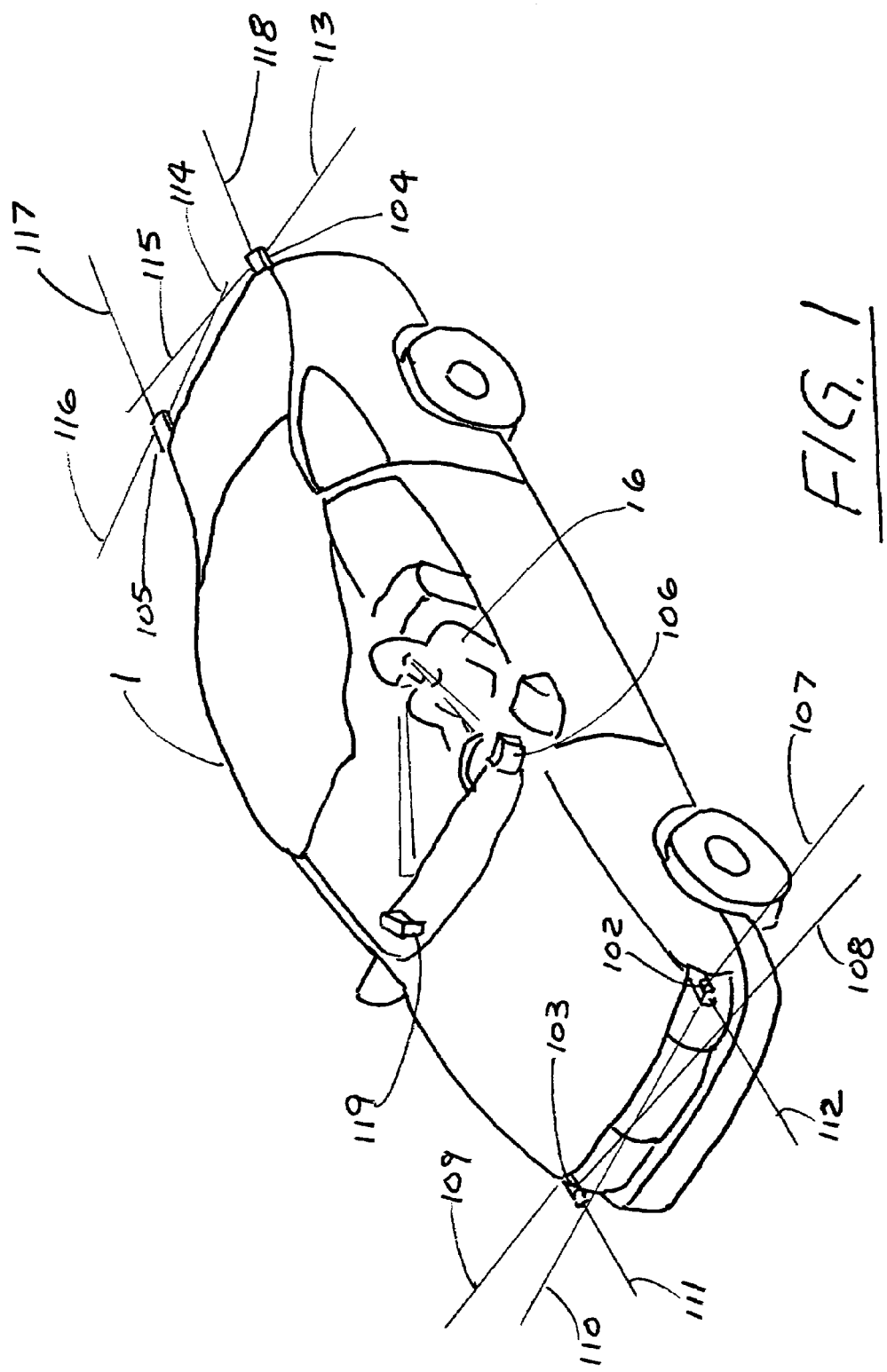
FIG. 1 is a perspective view of vehicle with driver observation system.

Referring now to the drawings, FIG. 1 shows a perspective view of a vehicle 1 with a part of the roof broken away to show the driver 16 operating the vehicle 1. In FIG. 1, the vehicle 1 is depicted as an automobile but the invention is equally suitable for other types of vehicles, including but not limited to vans, trucks, pick-up trucks, and sports utility vehicles.

In FIG. 1, the invention is shown as installed on all corners of vehicle 1. However, this depiction is to illustrate several possible embodiments and it is not intended or required that the invention be installed on all corners of the vehicle 1 to achieve the desirable objects of the invention.

A left front corner camera mirror assembly 102 is located at the left front corner of the vehicle 1, and a right front corner camera mirror assembly 103 is located at the right front corner of the vehicle 1. Also shown in FIG. 1 is a left rear corner camera mirror assembly 104 and a right rear corner camera mirror assembly 105. In FIG. 1, these camera mirror assemblies 102, 103, 104 and 105 are shown on the exterior of the vehicle 1, but it is not intended that these camera mirror assemblies be limited to external installation.

Also depicted in FIG. 1 is a left monitor 106 and a right monitor 119 within the vision of the driver 16.

Also shown in FIG. 1 is a left light image 107 entering the left front corner camera mirror assembly 102, and a left light image 108 entering the right front corner camera mirror assembly 103, as well as a right light image 109 entering the right front corner camera mirror assembly and a right light image 110 entering the left front corner camera mirror assembly 102. In addition a forward light image 111 is shown entering the right front corner camera mirror assembly and a forward light image 112 is shown entering the left front corner camera mirror assembly.

FIG. 1 also shows a left light image 113 entering the left rear corner camera mirror assembly 104, a left light image 114 entering the right rear corner camera mirror assembly 105, a right light image 115 entering the left rear corner camera mirror assembly 104 and a right light image 116 entering the right rear corner camera mirror assembly 105. In addition a rear light image 117 is shown entering the right rear corner camera mirror assembly and a rear light image 118 is shown entering the left rear corner camera mirror assembly.

Figure 2:
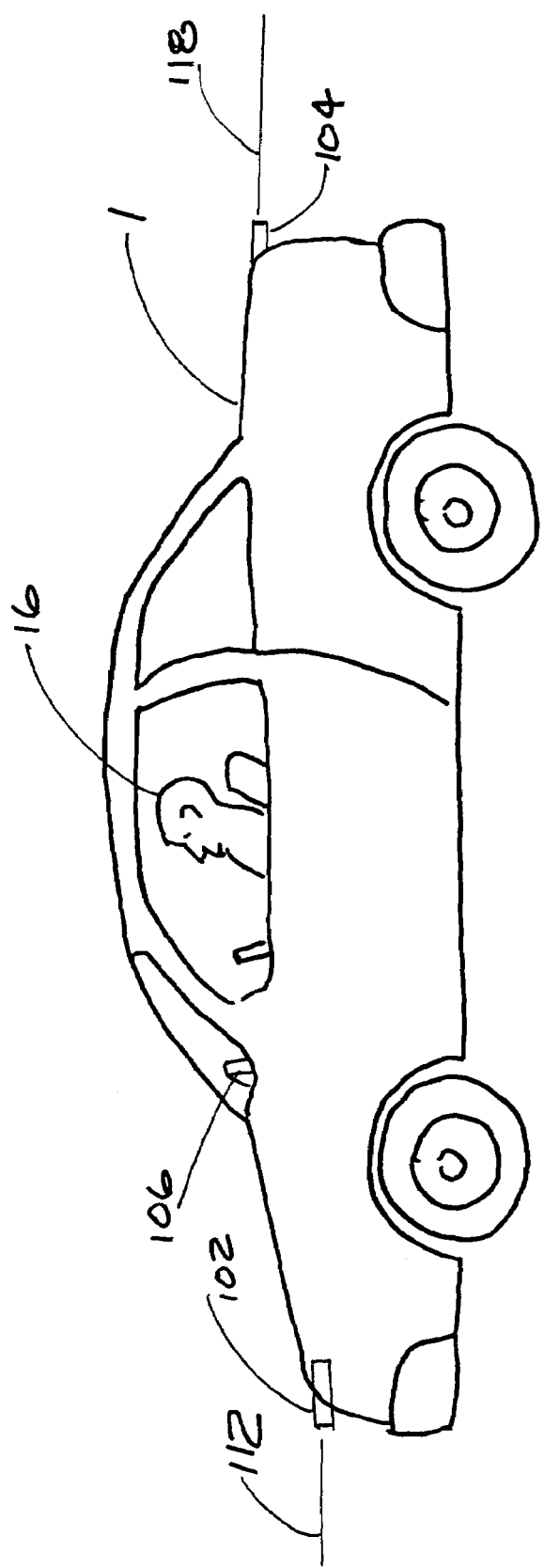
FIG. 2 is a left side view of vehicle with driver observation system.

FIG. 2 shows the left side view of a vehicle 1 operated by a driver 16 with certain embodiments of the invention. A left front corner camera mirror assembly 102 is shown on the left front exterior of the vehicle 1 and a left rear corner camera mirror assembly 104 is shown on the left rear exterior of the vehicle 1. The forward light image 112 is shown entering the left front corner camera mirror assembly 102 and a rear light image 118 is shown entering the left rear corner camera mirror assembly 104.

Figure 3:
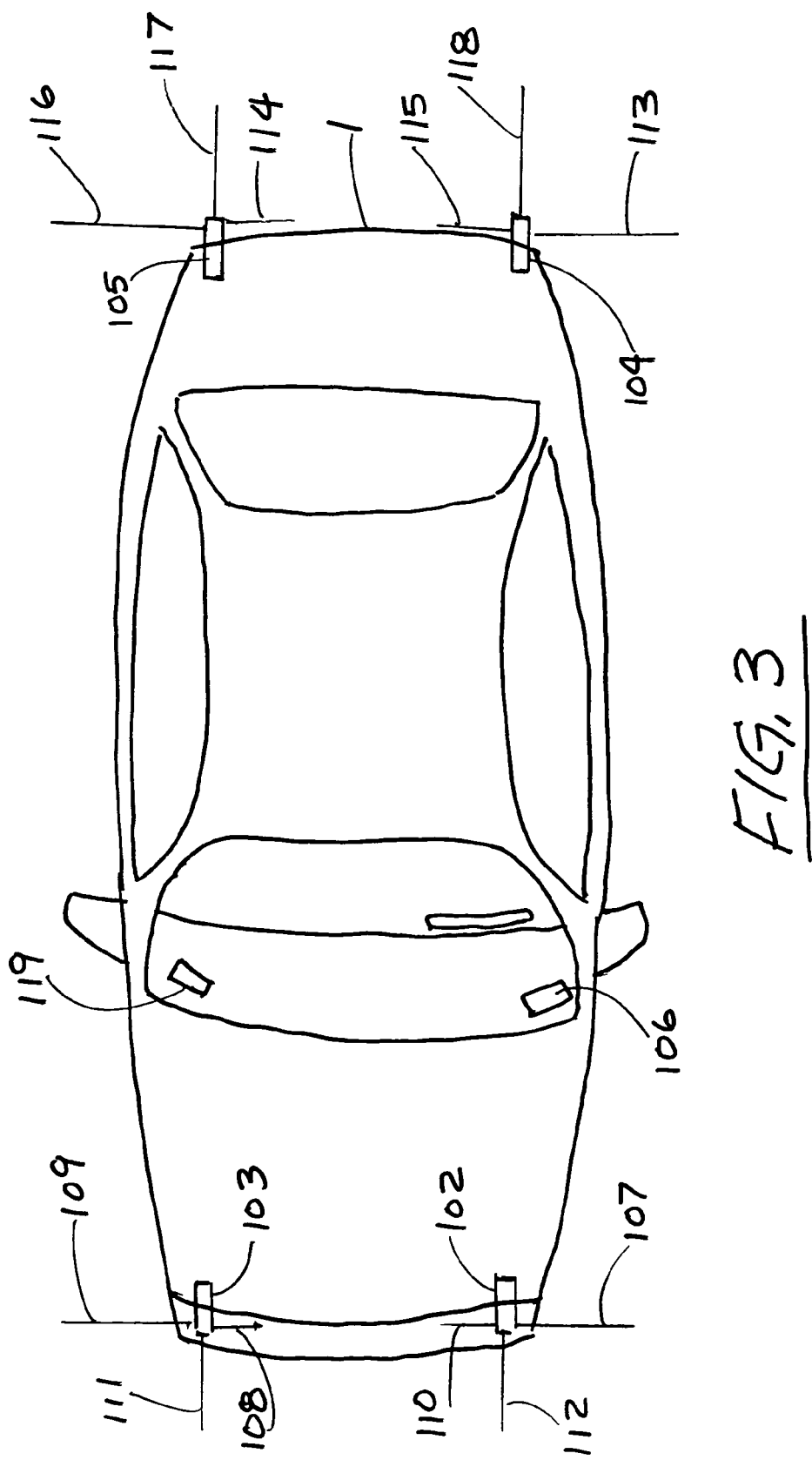
FIG. 3 is a plan view of vehicle with driver observation system.

FIG. 3 shows a plan view of a vehicle 1 with certain embodiments of the invention. A left front corner camera mirror assembly 102 is located at the left front corner of the vehicle 1, and a right front corner camera mirror assembly 103 is located at the right front corner of the vehicle 1. Also shown in FIG. 3 are a left rear corner camera mirror assembly 104 and a right rear corner camera mirror assembly 105 as well as a left monitor 106 and a right monitor 119.

Also shown in FIG. 3 is a left light image 107 entering the left front corner camera mirror assembly 102, and a left light image 108 entering the right front corner camera mirror assembly 103, as well as a right light image 109 entering the right front corner camera mirror assembly and a right light image 110 entering the left front corner camera mirror assembly 102. In addition a forward light image 111 is shown entering the right front corner camera mirror assembly and a forward light image 112 is shown entering the left front corner camera mirror assembly.

FIG. 3 also shows a left light image 113 entering the left rear corner camera mirror assembly 104, a left light image 114 entering the right rear corner camera mirror assembly 105, a right light image 115 entering the left rear corner camera mirror assembly 104 and a right light image 116 entering the right rear corner camera mirror assembly 105. In addition a rear light image 117 is shown entering the right rear corner camera mirror assembly and a rear light image 118 is shown entering the left rear corner camera mirror assembly.

Figure 4:
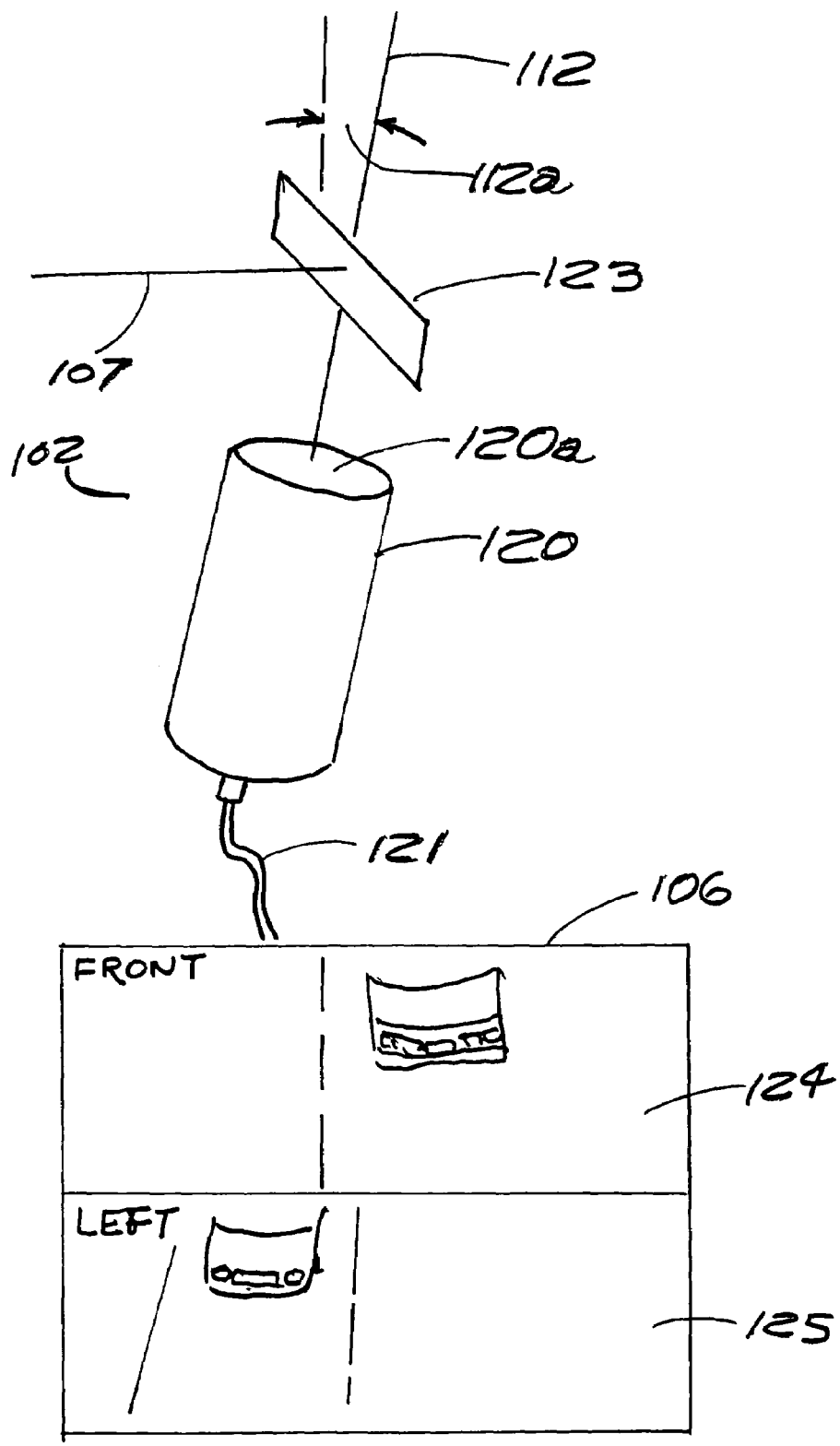
FIG. 4 is a schematic view of a camera mirror assembly installed in the left front corner of vehicle.

FIG. 4 shows a schematic view of a camera mirror assembly 102 installed in the left front corner of a vehicle 1. In FIG. 4 a left facing mirror 123 is shown in position ahead of a left front camera 120 with a receiving lens 120a. In this arrangement the left facing mirror is positioned at an angle to receive a left light image 107 and reflect the left light image to the receiving lens 120a and into the left front camera 120. By means of a transmission cable 121, the left light image 107 is displayed on the left monitor 106 within the vision of the driver 16. In this embodiment as depicted in FIG. 4, the left facing mirror 123 will only block a portion of the receiving lens 120a allowing a forward light image 112 to be received by the receiving lens 120a, into the left front camera 120 and transmitted by the transmission cable 121 to the left monitor 106 within the vision of the driver 16. The left light image 107 would be displayed as a lower image 125 on the left monitor 106 and the forward light image 112 would be displayed as an upper image 124 on the left monitor 106 or the images could be reversed. While the embodiment depicted in FIG. 4 is shown with a transmission cable 121 for transmitting a light image from the camera 120 to the left monitor 106, it is not intended that the transmission of the light image be limited to cable and alternative means such as fiber optic cable or wireless transmission may be employed.

As shown in FIG. 4 left front camera 120 is not aimed directly forward but is angled to the right at an angle 112a to enhance the vision of the driver 16 in left turn situations where the vehicle 1 is turning into the direction of oncoming traffic which is difficult to see because of vehicles directly ahead. It is intended that this orientation be reversed in right hand drive vehicles and countries. While the angle 112a may be fixed to suit an optimum placement to enhance the vision of the driver 16, an alternate embodiment not shown would comprise a pivotal mount and turning means to turn the camera on the pivotal mount to the most advantageous position at the control of the driver 16.

Although not shown it is understood that the camera mirror assemblies and monitors will normally receive power from the vehicle electrical service and such electrical service may be wired directly to such elements or wired integrally with the transmission cables.

Figure 5:
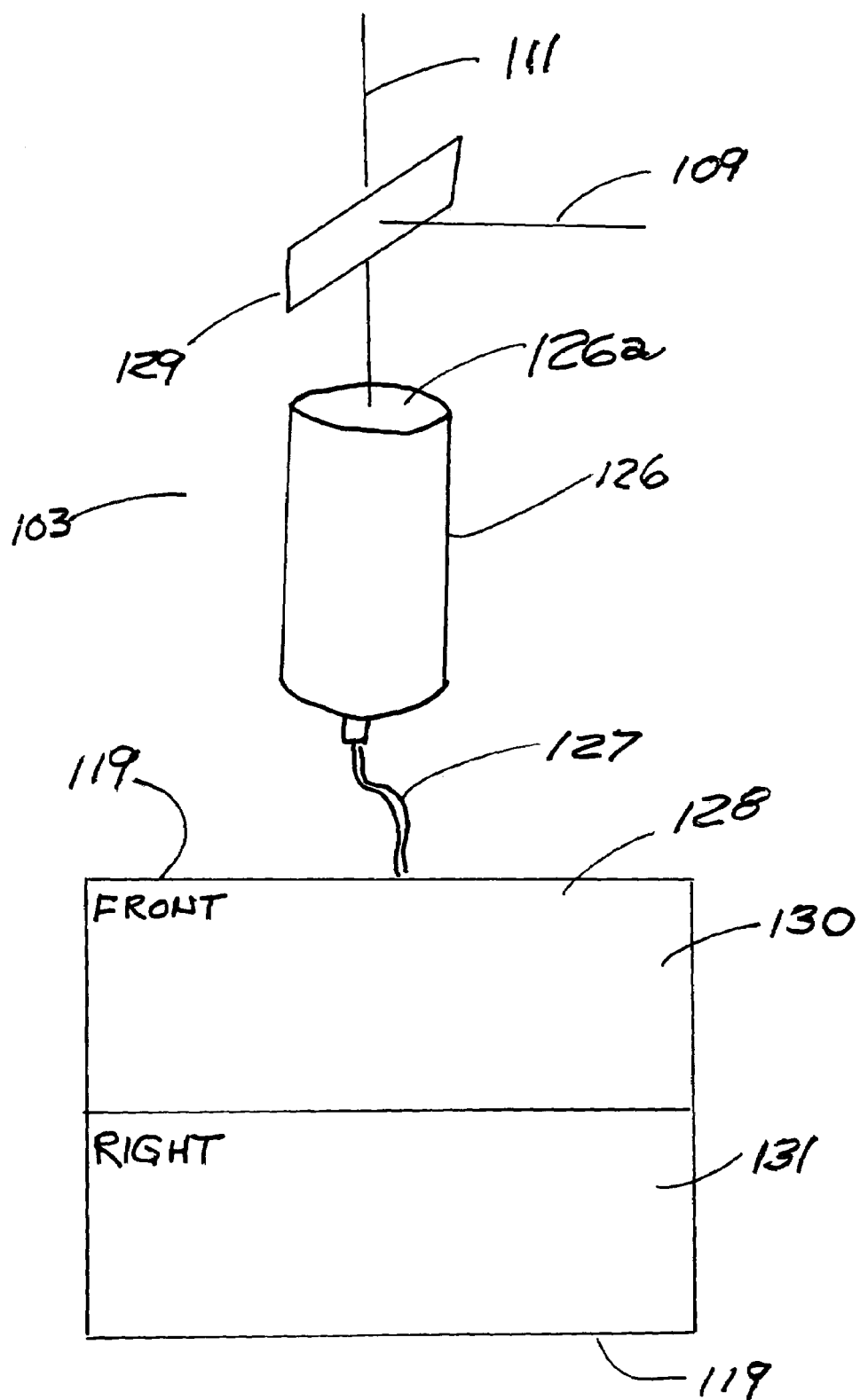
FIG. 5 is a schematic of a camera mirror assembly installed in the right front corner of vehicle.

FIG. 5 shows a schematic view of a camera mirror assembly 103 installed in the right front corner of a vehicle 1. In FIG. 5 a right facing mirror 129 is shown in position ahead of a right front camera 126 with a receiving lens 126a. In this arrangement the right facing mirror is positioned at an angle to receive a right light image 109 and reflect the right light image to the receiving lens 126a and into the right front camera 126. By means of a transmission cable 127, the right light image 109 is displayed on the right monitor 119 within the vision of the driver 16. In this embodiment as depicted in FIG. 5, the right facing mirror 129 will only block a portion of the receiving lens 126a allowing a forward light image 111 to be received by the receiving lens 126a into the right front camera 126 and transmitted by the transmission cable 127 to the right monitor 119 within the vision of the driver 16. The right light image 109 would be displayed as a lower image 131 on the right monitor 119 and the forward light image 111 would be displayed as an upper image 130 on the right monitor 119 or the images could be reversed. While the embodiment depicted in FIG. 5 is shown with a transmission cable 127 for transmitting a light image from the camera 126 to the right monitor 119, it is not intended that the transmission of the light image be limited to cable and alternative means such as fiber optic cable or wireless transmission may be employed.

It is intended that the embodiments depicted in FIGS. 4 and 5 can be used together or separately. Likewise, while not shown an alternate embodiment would comprise a pivotal mount and turning means to turn either or both cameras on pivotal mounts to the most advantageous position at the control of the driver 16.

Figure 6:
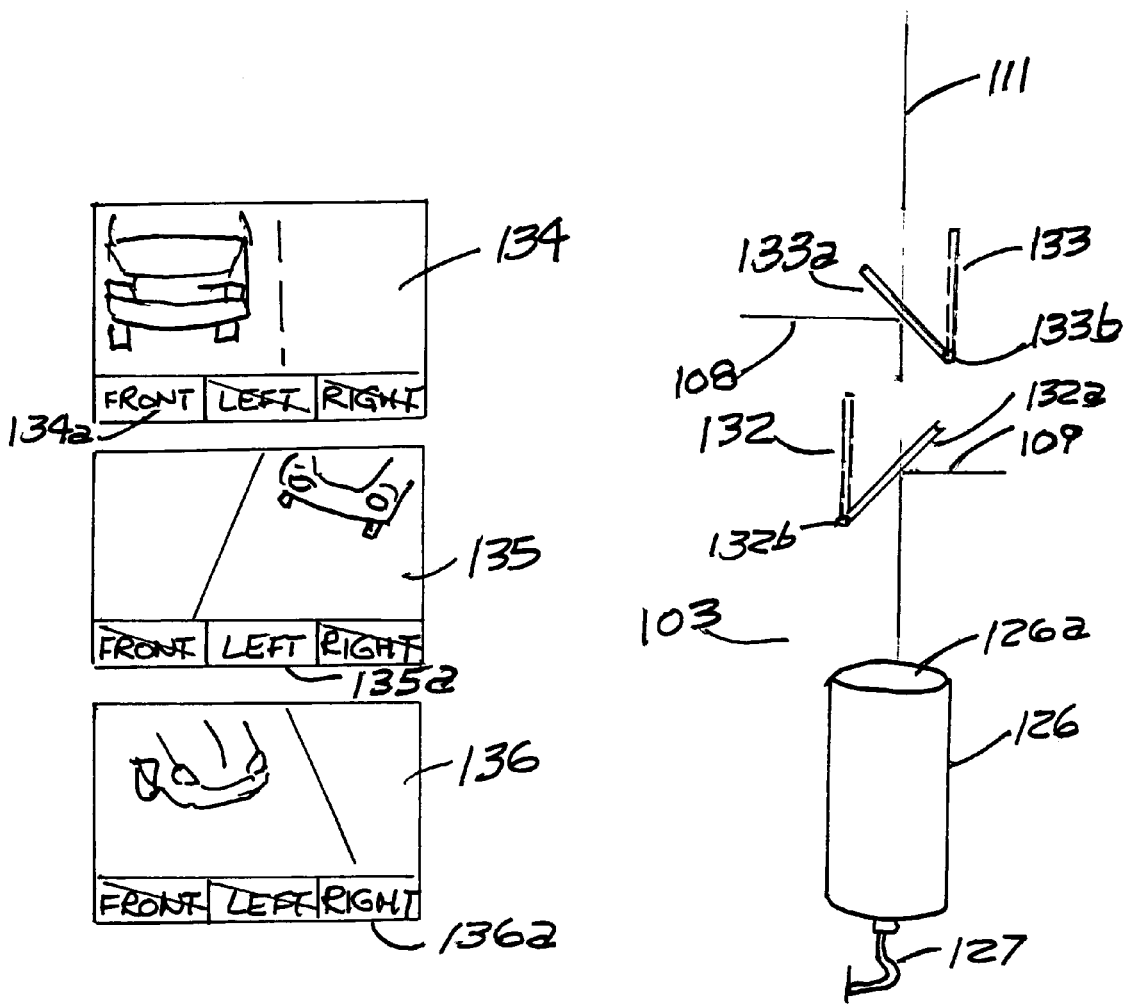
FIG. 6 is a schematic of an alternative camera mirror assembly installed in the right front corner of vehicle.

FIG. 6 shows a schematic view of an alternative right front camera mirror assembly 103. In this embodiment the right front camera 126 and receiving lens 126a are in line with a right pivoting mirror assembly 132 and a left pivoting mirror assembly 133. The right pivoting mirror assembly 132 is hinged to swing a mirror 132a on pivot 132b into position to receive a right light image 109 and reflect the right light image 109 to the receiving lens 126a and into the right front camera 126 for transmission by cable 127 to the left monitor 106 within the vision of the driver 16. Likewise, the left pivoting mirror assembly 133 is hinged to swing a mirror 133a on pivot 133b to receive a left light image 108 and reflect the left light image 108 to the receiving lens 126a and into the right front camera 126 for transmission by cable 127 to the left monitor 106 within the vision of the driver 16. When not in a position to receive and reflect a light image each mirror is retracted to allow the other mirror to receive and reflect a light image or both mirrors are retracted to allow a forward light image 111 to be received by the receiving lens 126a into the right front camera 126 and transmitted by the transmission cable 127 to the left monitor 119 within the vision of the driver 16. While the embodiment depicted in FIG. 6 is shown with a transmission cable 127 for transmitting a light image from the camera 126 to the left monitor 106, it is not intended that the transmission of the light image be limited to cable and alternative means such as fiber optic cable or wireless transmission may be employed. An alternate embodiment not shown would comprise a pivotal mount and turning means to turn the camera on the pivotal mount to the most advantageous position at the control of the driver 16. Likewise, it is not intended that the position of the pivoting mirrors be limited to one of two positions.

In FIG. 6, the left monitor 106 is depicted with a forward image 134 showing the forward light image 111, a left image 135 showing the left light image 108, and a right light image 136 showing the right light image 109. Also shown are a forward image control button 134a, a left image control button 135a, and a right image control button 136a. When the forward image control button 134a is activated, both the right pivoting mirror assembly 132 and the left pivoting mirror assembly 133 are in their retracted positions allowing the forward light image 111 to reach the receiving lens 126a. When the left image control button 135a is activated, the mirror 133a swings into position on pivot 133b to receive a left light image 108 and reflect the left light image 108 to the receiving lens 126a. When the right image control button 136a is activated, the mirror 132a swings into position on pivot 132b to receive a right light image 109 and reflect the left light image 109 to the receiving lens 126a. The pivoting mirror assemblies may be activated by any suitable mechanism such as an electrical solenoid, vacuum control or gears.

Figure 7:
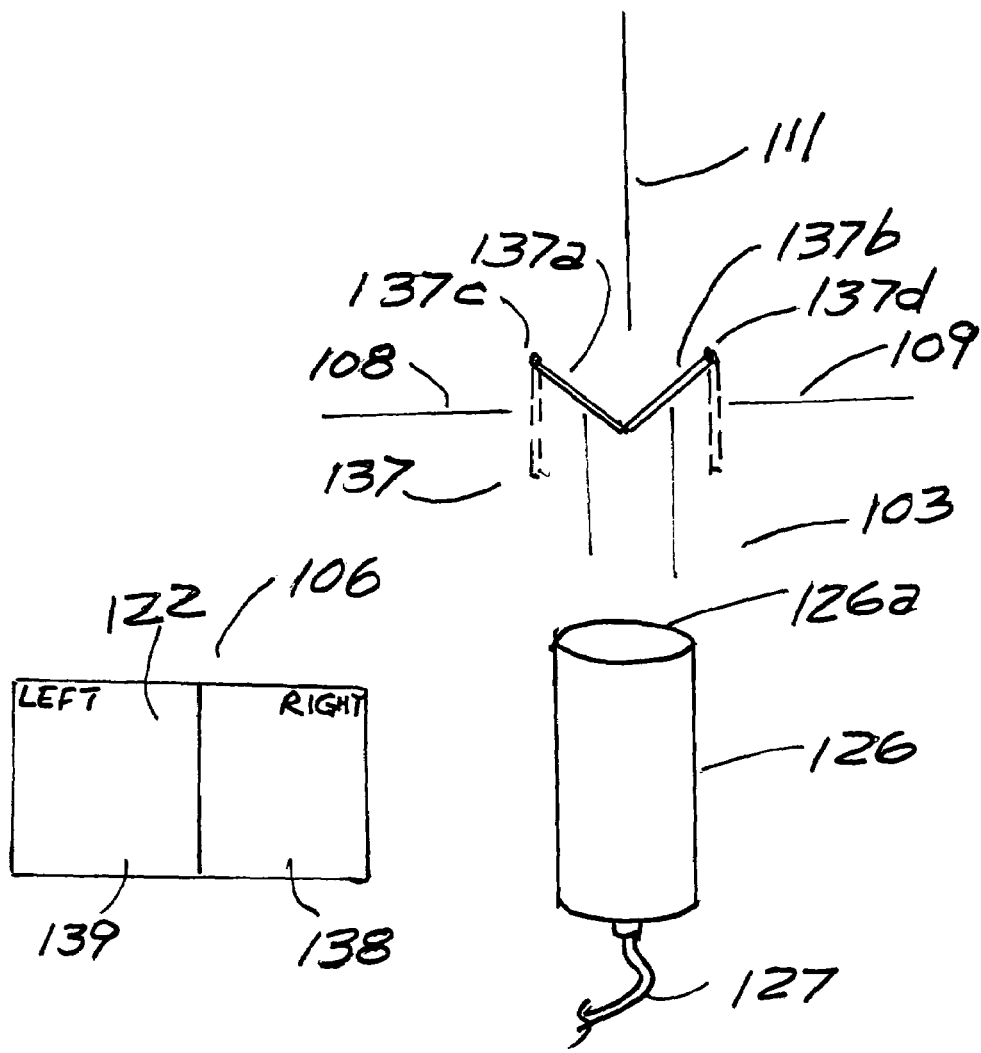
FIG. 7 is a schematic of another alternative camera mirror assembly installed in the right front corner of vehicle.

FIG. 7 shows a schematic view of another alternative right front camera mirror assembly 103 installed in the right front corner of the vehicle 1. In this embodiment the right front camera 126 and receiving lens 126a are in line with a pyramid pivoting mirror assembly 137 with a right pivoting mirror 137a and a left pivoting mirror 137b. The right pivoting mirror 137a is hinged on pivot 137c to swing into position to receive a right light image 109 and reflect the right light image 109 to the receiving lens 126a and into the right front camera 126 for transmission by cable 127 to the left monitor 106 within the vision of the driver 16. Likewise, the left pivoting mirror 137b is hinged on pivot 137d to swing into position to receive a left light image 108 and reflect the left light image 108 to the receiving lens 126a and into the right front camera 126 for transmission by cable 127 to the left monitor 106 within the vision of the driver 16. When not in a position to receive and reflect a light image each mirror is retracted to allow a forward light image 111 to be received by the receiving lens 126a into the right front camera 126 and transmitted by the transmission cable 127 to the left monitor 119 within the vision of the driver 16. While the embodiment depicted in FIG. 7 is shown with a transmission cable 127 for transmitting a light image from the camera 126 to the left monitor 106, it is not intended that the transmission of the light image be limited to cable and alternative means such as fiber optic cable or wireless transmission may be employed. The pivoting mirror assemblies may be activated by any suitable mechanism such as an electrical solenoid, vacuum control or gears.

As shown in FIG. 7, the left light image 108 would be displayed as a left image 139 on screen 122 of the left monitor 106 and the right light image 109 would be displayed as right image 138 on screen 122 of the left monitor 106. When the mirrors 137a and 137b were retracted then the screen 122 would display the forward image 111. An alternate embodiment not shown would comprise a pivotal mount and turning means to turn the camera on the pivotal mount to the most advantageous position at the control of the driver 16. Likewise, it is not intended that the position of the pivoting mirrors be limited to one of two positions.

Figure 8:
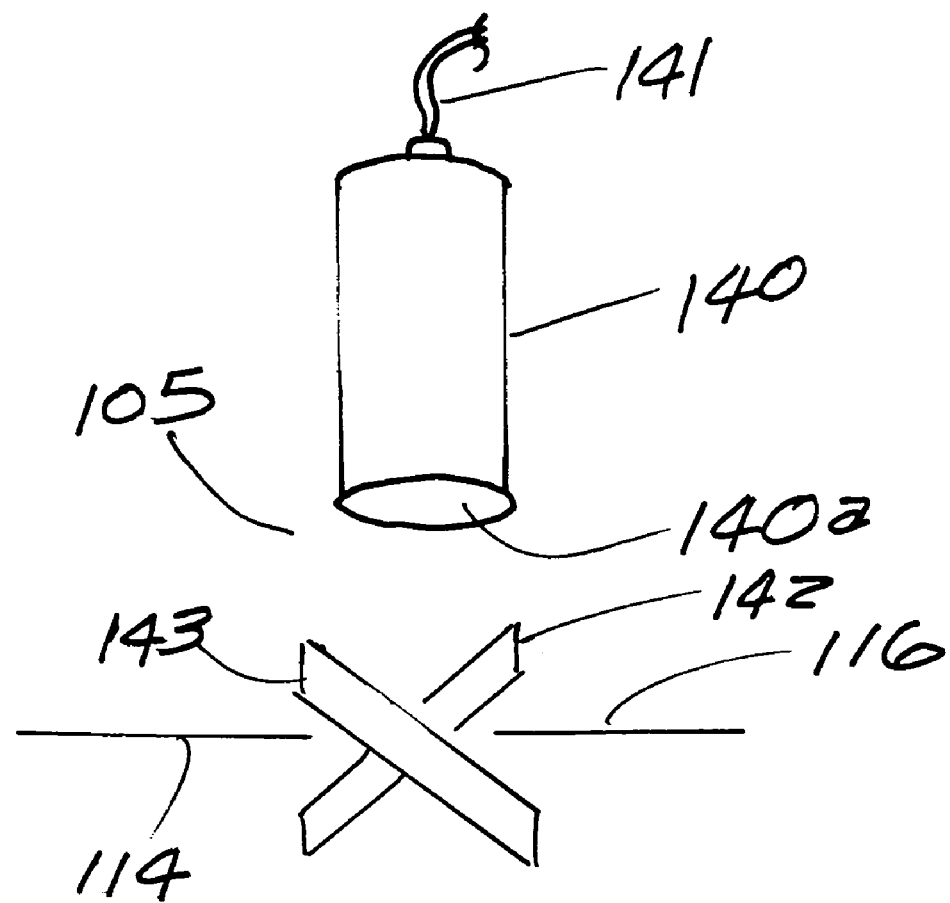
FIG. 8 is a schematic of a camera mirror assembly installed in a rear corner of vehicle.

FIG. 8 shows a schematic view of a camera mirror assembly 105 installed in the right rear corner of a vehicle 1. In FIG. 8 a left facing mirror 143 and a right facing mirror 142 are shown in crisscross position one above the other and ahead of a right rear camera 140 with a receiving lens 140a. In this arrangement the left facing mirror 143 is positioned at an angle to receive a left light image 114 and reflect the left light image 114 to the receiving lens 140a and into the right rear camera 140. Likewise, the right facing mirror 142 is positioned at an angle to receive a right light image 116 and reflect the right light image 116 to the receiving lens 140a and into the right rear camera 140. By means of a transmission cable 141, the left light image 114 and right light image 116 are displayed on either the left monitor 106 or the right monitor 119 within the vision of the driver 16. Although not shown, it is understood that the left light image 114 and right light image 116 could be displayed as side by side images or top and bottom images on either monitor in a manner similar to that depicted in FIG. 4 and FIG. 7. Likewise, the mirror arrangement depicted in FIG. 8 would be equally applicable to any corner camera mirror assembly, both front and rear. Also, While the embodiment depicted in FIG. 8 is shown with a transmission cable 141 for transmitting a light image from the camera 140 to a monitor, it is not intended that the transmission of the light image be limited to cable and alternative means such as fiber optic cable or wireless transmission may be employed. An alternate embodiment not shown would comprise a pivotal mount and turning means to turn the camera on the pivotal mount to the most advantageous position at the control of the driver 16.

Figure 9:
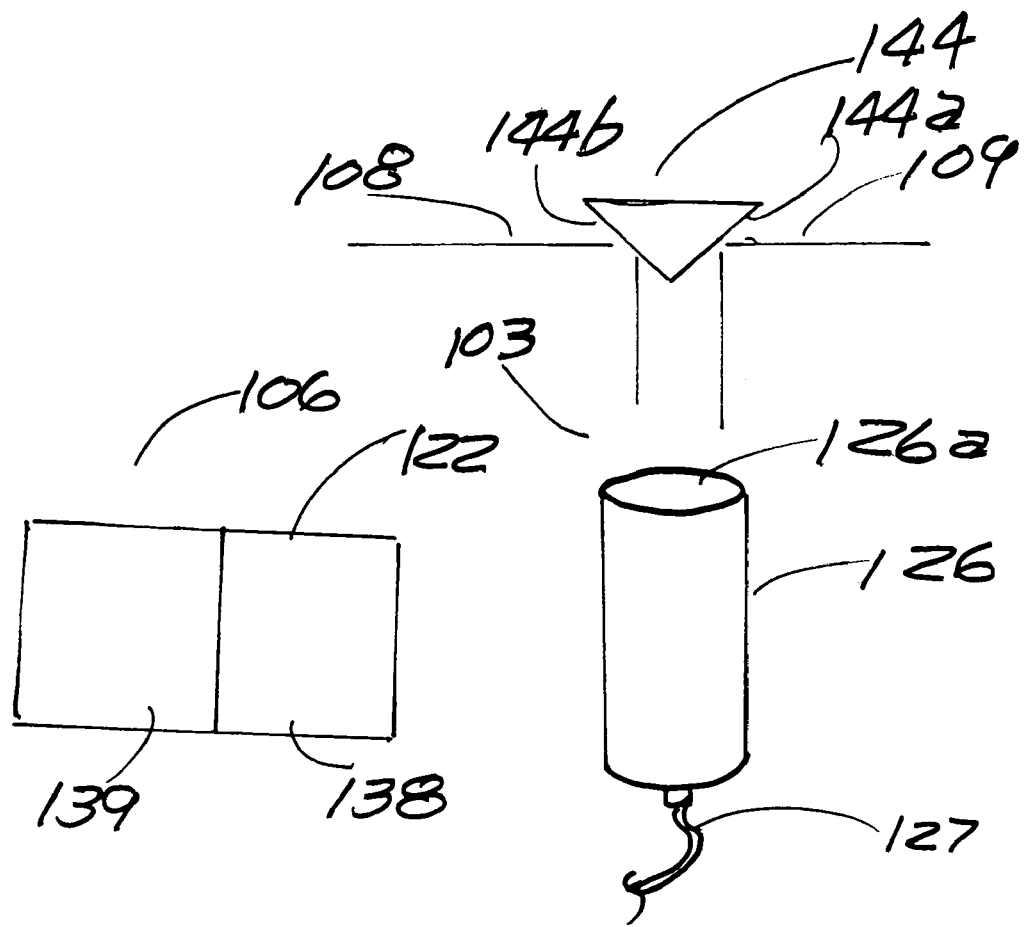
FIG. 9 is a schematic of an alternative camera mirror assembly installed in a front corner of vehicle.

FIG. 9 shows a schematic view of another alternative right front camera mirror assembly 103 installed in the right front corner of the vehicle 1. In this embodiment the right front camera 126 and receiving lens 126a are in line with a pyramid mirror assembly 144 with a right facing mirror surface 144a and a left facing mirror surface 144b. The right facing mirror surface 144a is in a position to receive a right light image 109 and reflect the right light image 109 to the receiving lens 126a and into the right front camera 126 for transmission by cable 127 to the left monitor 106 within the vision of the driver 16. Likewise, the left facing mirror surface 144b is in a position to receive a left light image 108 and reflect the left light image 108 to the receiving lens 126a and into the right front camera 126 for transmission by cable 127 to the left monitor 106 within the vision of the driver 16. While the embodiment depicted in FIG. 9 is shown with a transmission cable 127 for transmitting a light image from the camera 126 to the left monitor 106, it is not intended that the transmission of the light image be limited to cable and alternative means such as fiber optic cable or wireless transmission may be employed. An alternate embodiment not shown would comprise a pivotal mount and turning means to turn the camera on the pivotal mount to the most advantageous position at the control of the driver 16.

As shown in FIG. 9, the left light image 108 would be displayed as a left image 139 on screen 122 of the left monitor 106 and the right light image 109 would be displayed as right image 138 on screen 122 of the left monitor 106.

Figure 10:
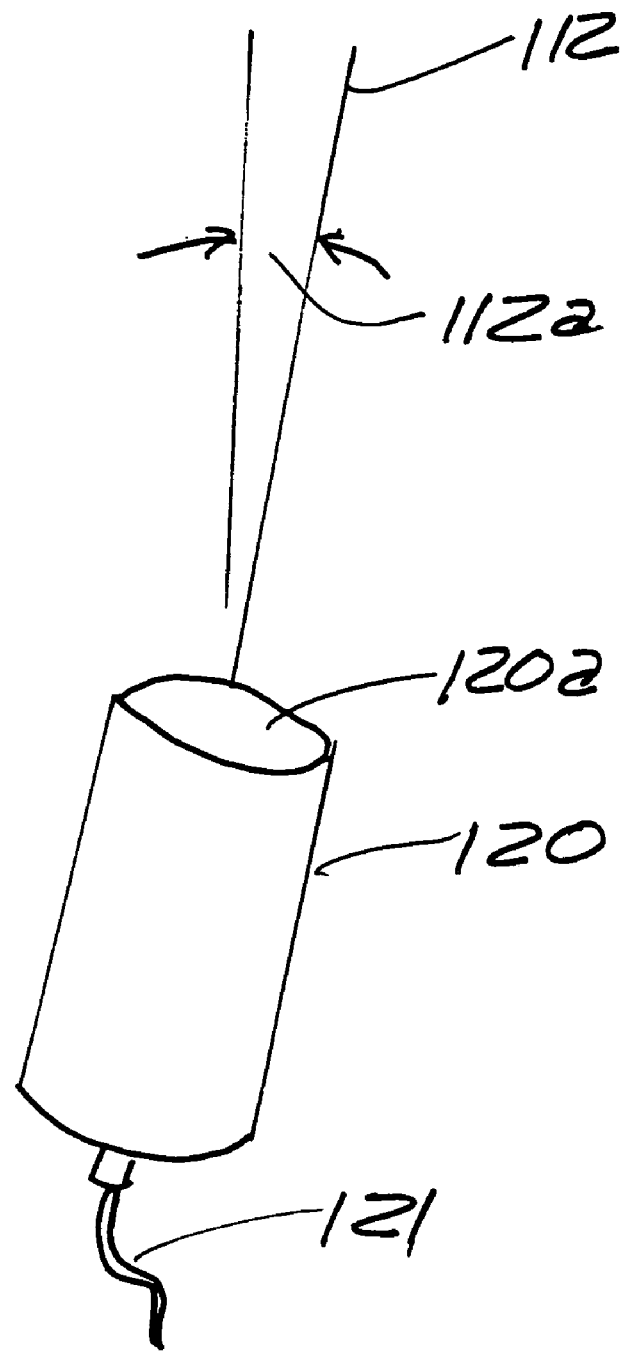
FIG. 10 is a schematic of a camera installed in the left front corner of vehicle.

FIG. 10 is a schematic of a camera installed in the left front corner of vehicle 1 to receive a forward light image 112 into the receiving lens 120a and into the left front camera 120 for transmission by cable 121 to the left monitor 106 within the vision of the driver 16. The left front camera 120 is not aimed directly forward but is angled to the right at an angle 112a to enhance the vision of the driver 16 in left turn situations where the vehicle 1 is turning into the direction of oncoming traffic which is difficult to see because of vehicles directly ahead. It is intended that this orientation be reversed in right hand drive vehicles and countries. While the angle 112a may be fixed to suit an optimum placement to enhance the vision of the driver 16, an alternate embodiment not shown would comprise a pivotal mount and turning means to turn the camera on the pivotal mount to the most advantageous position at the control of the driver 16.

Figure 11:
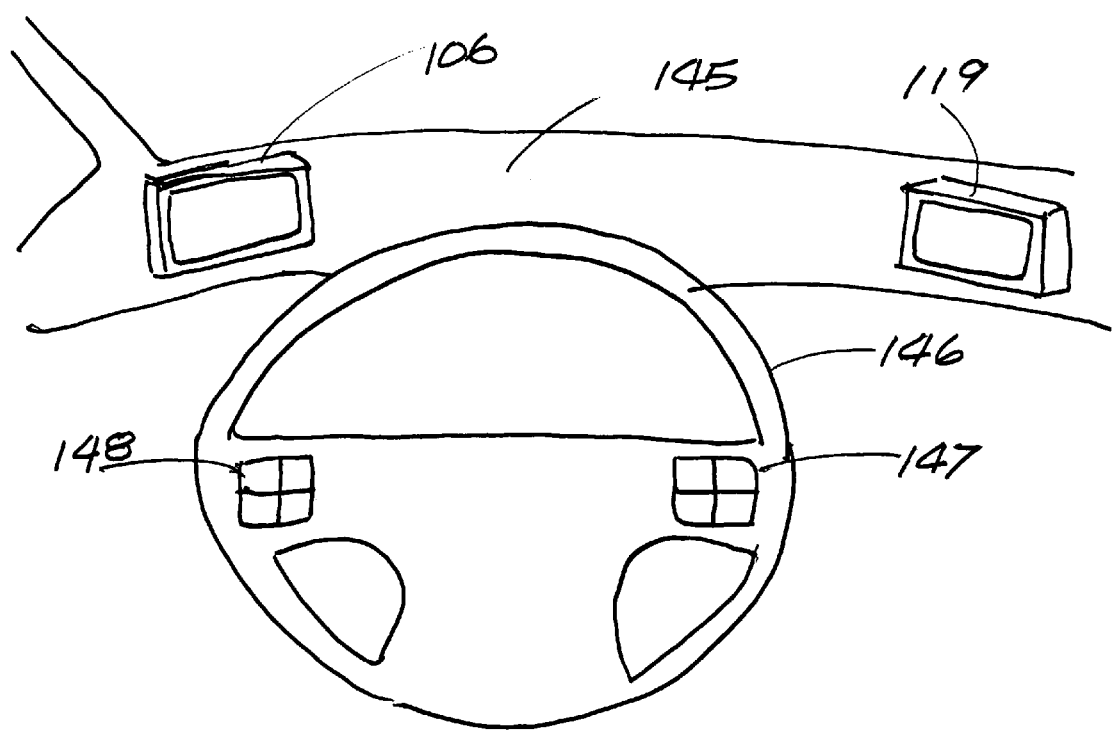
FIG. 11 is a perspective view of the dashboard of a vehicle with the driver observation system.

FIG. 11 shows a perspective view of the dashboard 145 of a vehicle with the driver observation system and depicts the steering wheel 146 and a left monitor 106 and a right monitor 119 both mounted on the dashboard 145 in the sight of the driver. On the steering wheel are also shown a set of left control buttons 148 and right control buttons 147 to control the screen images presented on the monitors as generally depicted in the embodiments shown in FIGS. 4 through 10 in accord with the camera mirror assemblies installed on a vehicle. It is understood that these controls could select left, right, forward and rear light images or any combination and said controls would serve to activate any motors or driving devices to position the mirrors, the cameras or the camera mirror assemblies in the desired position or otherwise activate any feature of the camera such as focus or zoom. Likewise, it is understood that these controls could be mounted on the monitors or other location within the reach of the driver.

Figure 12:
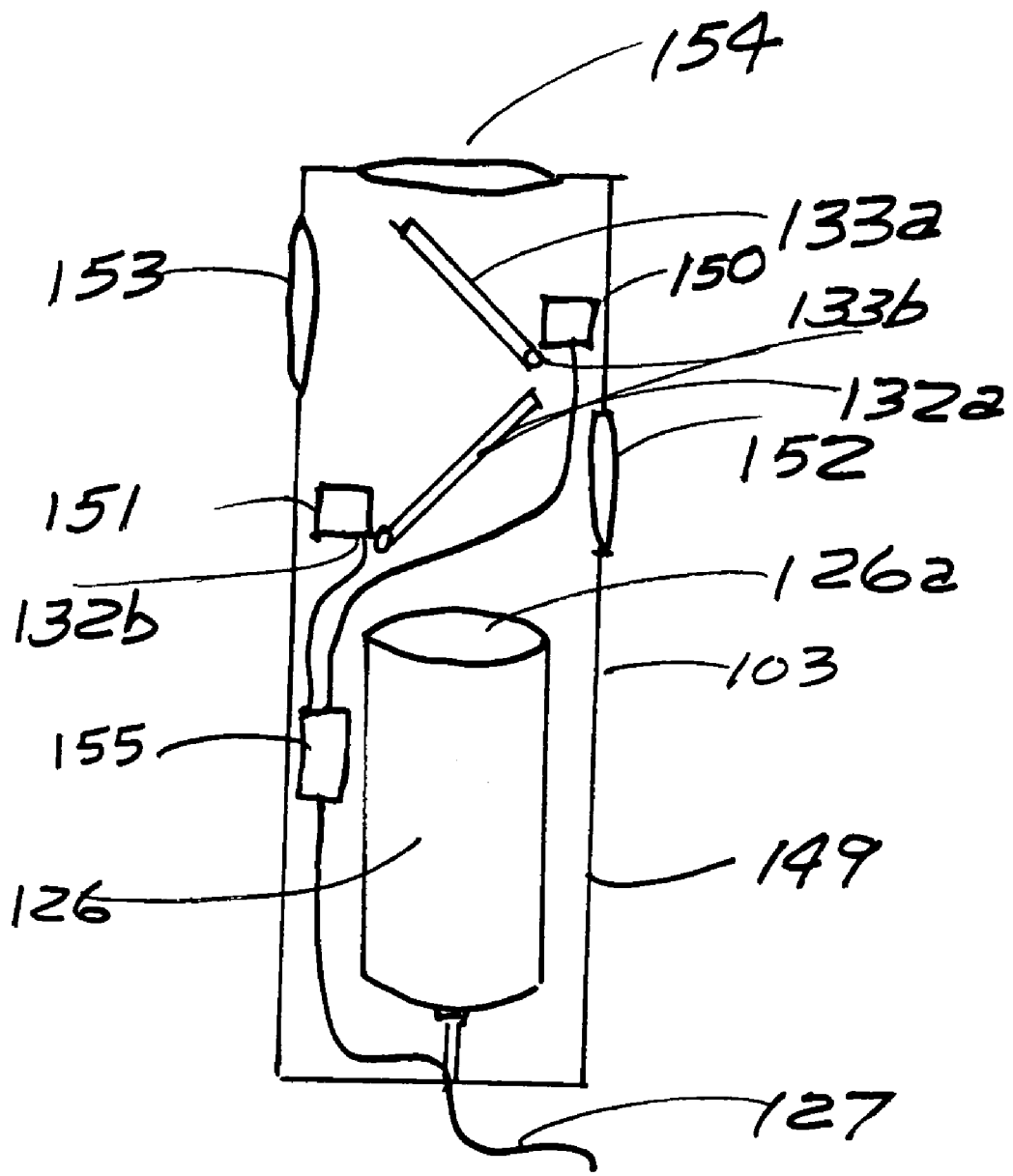
FIG. 12 is a schematic of a camera mirror assembly housing.

FIG. 12 shows a schematic of a camera mirror assembly housing 149 for encasing a right front corner camera mirror assembly 103 as depicted in FIG. 6, where the right front camera 126 and receiving lens 126a are in line with a right pivoting mirror assembly 132 and a left pivoting mirror assembly 133. The right pivoting mirror assembly 132 is hinged to swing a mirror 132a on pivot 132b into position to receive a right light image 109 and reflect the right light image 109 to the receiving lens 126a and into the right front camera 126 for transmission by cable 127 to the left monitor 106 within the vision of the driver 16. Likewise, the left pivoting mirror assembly 133 is hinged to swing a mirror 133a on pivot 133b to receive a left light image 108 and reflect the left light image 108 to the receiving lens 126a and into the right front camera 126 for transmission by cable 127 to the left monitor 106 within the vision of the driver 16.

In FIG. 12, a right pivoting mirror motor 150 is shown to move the mirror 133a on pivot 133b, and a left pivoting mirror motor 151 is shown to move the mirror 132a on pivot 132b. Also shown is a control module 155 to activate the motors 151 and 150 in accord with the control instructions from the driver 16. It is intended that the camera mirror assembly housing 149 be of material of adequate strength and stiffness to hold the components in proper position and to be impervious to weather conditions. As shown in FIG. 12, the housing 149 has right light image aperture 152 to permit the reception of a right light image; a left light image aperture 153 to permit the reception of a left light image; and a forward light aperture 154 to permit the reception of a forward light image. It is intended that said apertures be of rigid transparent material such as tempered glass or plastic and made an integral part of the housing 149 to maintain protection against weather and entrance of foreign matter into the camera mirror assembly. It is understood also, that the pivoting mirror motors 150 and 151 may be any suitable drive mechanism whether electrically, hydraulically, vacuum or pneumatically powered. Although not shown an alternate embodiment would comprise a pivotal mount and turning means to turn the housing 149 on the pivotal mount to the most advantageous position at the control of the driver 16.

Figure 13:
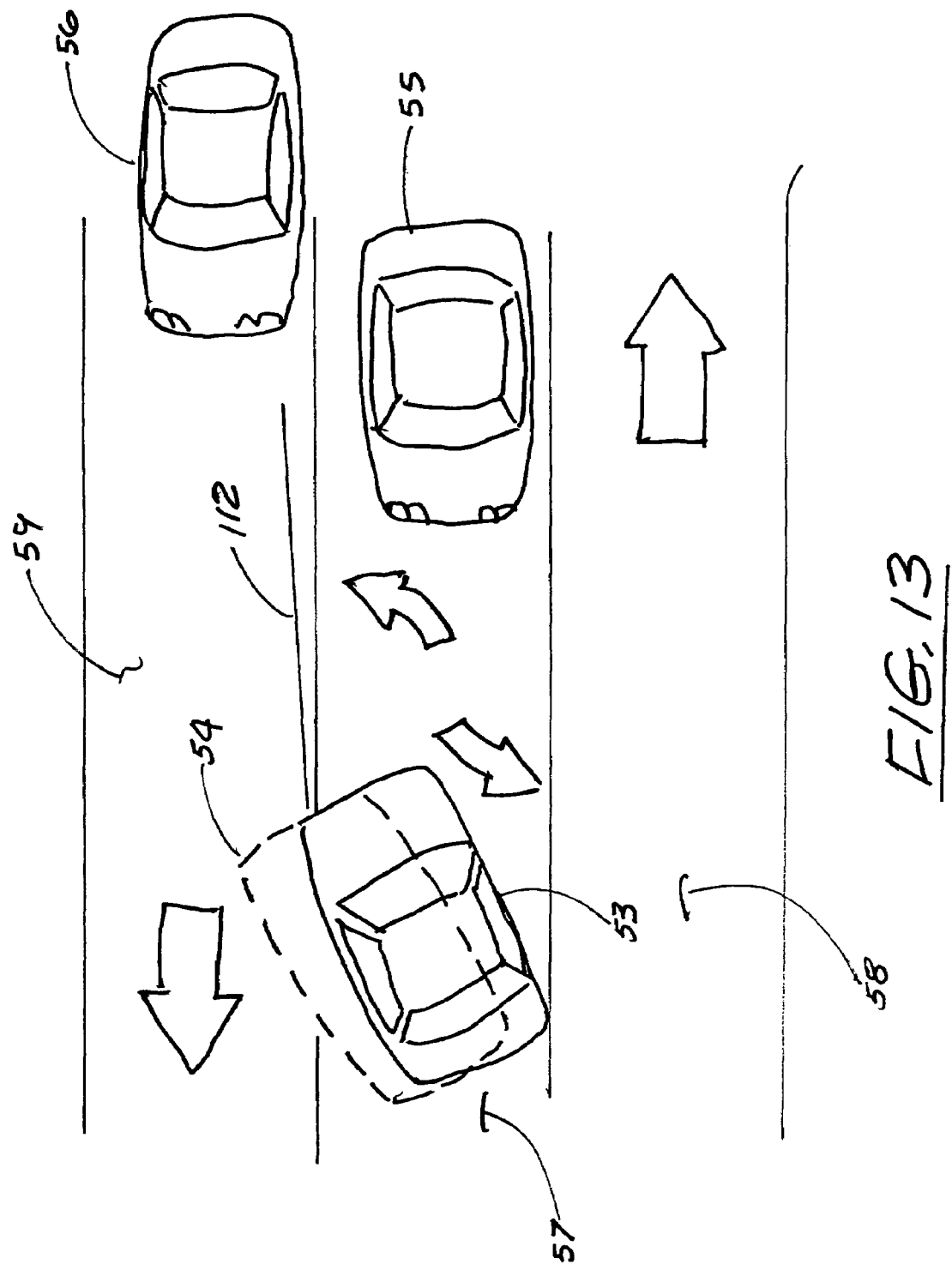
FIG. 13 is a plan view of vehicle with driver observation system in left turn situation in common turning lane.

FIG. 13 shows a plan view of a vehicle 53 with the invention attempting a left turn from a common turning lane 57 across an oncoming traffic lane 59 with an oncoming vehicle 56 while facing an opposing turning vehicle 55 in the common turning lane 57. In this depiction, the vehicle 53 will have moved from the traffic lane 58 into the common turning lane 57 to turn left across the opposing lane 59. In this situation the driver of vehicle 53 would have a clear view of oncoming traffic in lane 59 except for the opposing vehicle 55 coming in the opposite direction and attempting a left turn across traffic lane 58. At this point, the driver of vehicle 53 must nose the vehicle out into the oncoming lane to see any oncoming vehicles 56. When equipped with the driver observation system, the left front corner of the vehicle 53 need only extend slightly to the left so that a forward light image 112 would be received at the left front corner camera mirror assembly and transmitted to the vision of the driver. In contrast, a vehicle 54 without the invention would have to turn into the oncoming traffic lane 59 a sufficient distance to allow the driver to see the oncoming traffic from the controls of the vehicle. This increased distance could be enough to cause an accident.

Figure 14:
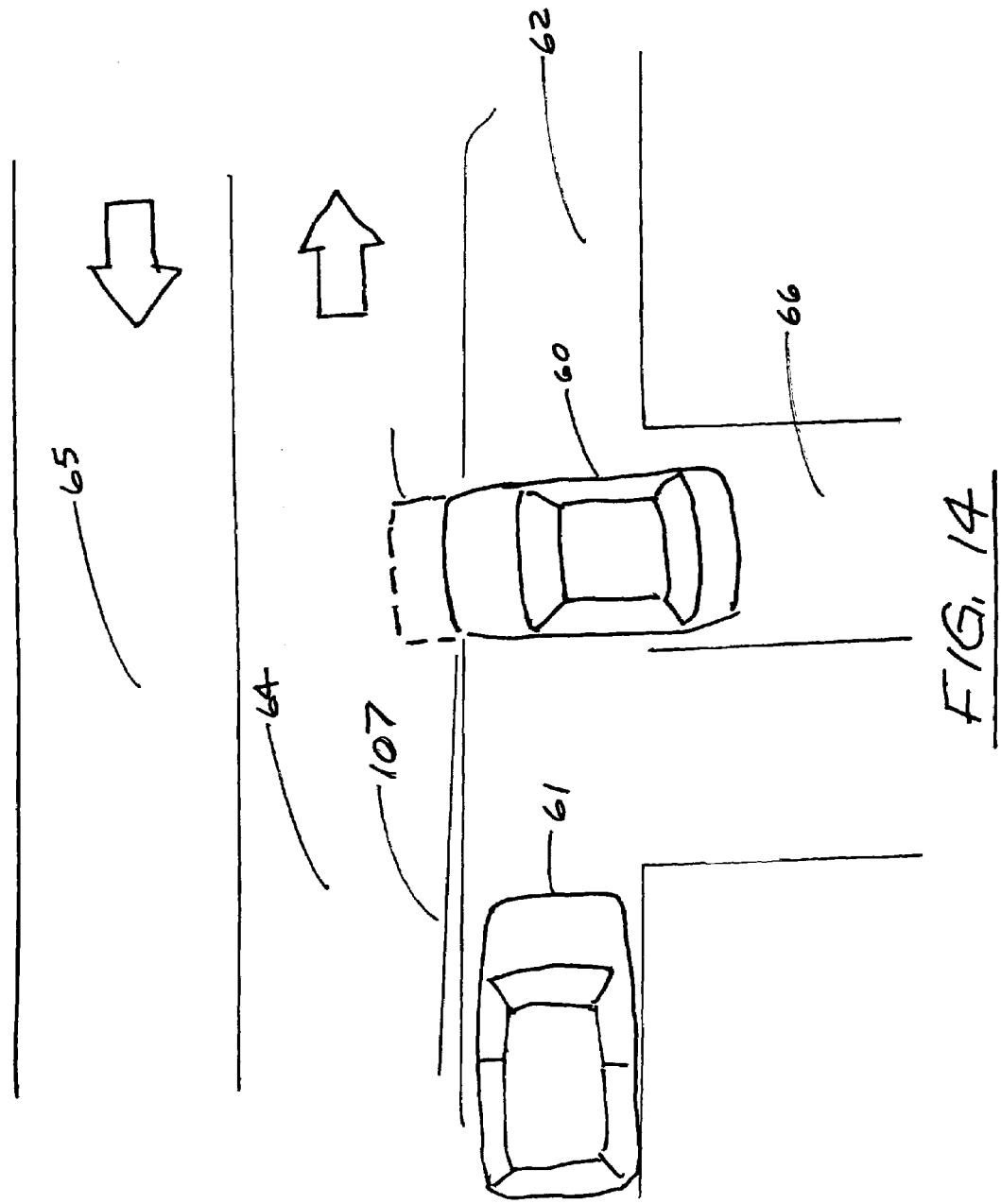
FIG. 14 is a plan view of vehicle with driver observation system attempting to turn into cross street.

FIG. 14 shows a plan view of a vehicle 60 with the invention attempting to turn left onto an intersecting street from a cross street 66 by crossing an opposing lane 64 to reach a merging lane 65. A parked vehicle 61 obstructs the vision of the driver of vehicle 60. When equipped with the driver observation system, vehicle 60 need only proceed slightly forward to receive a left light image 107 at the left front corner camera mirror assembly and have that image transmitted to the driver. In contrast, a vehicle 63 without the invention would have to proceed almost half the length of the vehicle forward to allow the driver to see oncoming traffic.

The camera can be any commercially available unit with or without focusing or zoom features.

I claim:

1. A driver observation system for use with a driver-operated vehicle, said driver observation system comprising;
   a) at least one corner camera mirror assembly disposed to receive light images from a front corner of the vehicle, said corner camera assembly comprising:
      a video camera for receiving forward light images and side light images; and
      at least one side facing mirror to receive and reflect the side light image not within the vision of the driver, the at least one side facing mirror reflecting the side light image to the video camera;
   b) transmitting means from said video camera to communicate said light image;
   c) a display monitor within the vision of the driver to receive said light image from the transmitting means.

2. A driver observation system for use with a driver operated vehicle according to claim 1 where the transmitting means comprises at least one cable between the video camera and display monitor.

3. A driver observation system for use with a driver operated vehicle according to claim 1 where the transmitting means comprises wireless communication between the video camera and display monitor.

4. A driver observation system for use with a driver operated vehicle according to claim 1, where at least one said side facing mirror further comprises a pivotal mount and control means to rotate said side facing mirror to allow the video camera to receive a light image not reflected from said mirror, and a display monitor within the vision of the driver to receive the light image not reflected from said mirror through the transmitting means.

5. A driver observation system for use with a driver operated vehicle according to claim 2, where at least one said side facing mirror further comprises a pivotal mount and control means to rotate said side facing mirror to allow the video camera to receive a light image not reflected from said mirror, and a display monitor within the vision of the driver to receive the light image not reflected from said mirror through the transmitting means.

6. A driver observation system for use with a driver operated vehicle according to claim 3, where at least one said side facing mirror further comprises a pivotal mount and control means to rotate said side facing mirror to allow the video camera to receive a light image not reflected from said mirror, and a display monitor within the vision of the driver to receive the light image not reflected from said mirror through the transmitting means.

7. A driver observation system for use with a driver-operated vehicle, said driver observation system comprising;
   a) at least one corner camera assembly disposed to receive light images from a rear corner of the vehicle, said corner camera assembly comprising:
   a video camera for receiving forward light images and side light images; and
   at least one side facing mirror to receive and reflect a light image not within the vision of the driver and said video camera to receive said light image reflected from said mirror;
   b) transmitting means from said camera to communicate said light image;
   c) a display monitor within the vision of the driver to receive said light image through the transmitting means.

8. A driver observation system for use with a driver operated vehicle according to claim 7 where the transmitting means comprises at least one cable between the video camera and display monitor.

9. A driver observation system for use with a driver operated vehicle according to claim 7 where the transmitting means comprises wireless communication between the video camera and display monitor.

10. A driver observation system for use with a driver operated vehicle according to claim 7, where at least one said side facing mirror further comprises a pivotal mount and control means to rotate said side facing mirror to allow the video camera to receive a light image not reflected from said mirror, and a display monitor within the vision of the driver to receive the light image not reflected from said mirror through the transmitting means.

11. A driver observation system for use with a driver operated vehicle according to claim 8, where at least one said side facing mirror further comprises a pivotal mount and control means to rotate said side facing mirror to allow the video camera to receive a light image not reflected from said mirror, and a display monitor within the vision of the driver to receive the light image not reflected from said mirror through the transmitting means.

12. A driver observation system for use with a driver operated vehicle according to claim 9, where at least one said side facing mirror further comprises a pivotal mount and control means to rotate said side facing mirror to allow the video camera to receive a light image not reflected from said mirror, and a display monitor within the vision of the driver to receive the light image not reflected from said mirror through the transmitting means.

13. A driver observation system for use with a driver operated vehicle according to claim 7, further comprising;
   a) at least one corner camera mirror assembly disposed to receive light images from a rear corner of the vehicle with a right facing mirror and a left facing mirror to receive and reflect light images not within the vision of the driver and a camera to receive said light images reflected from said mirrors;
   b) transmitting means from said camera to communicate said light images;
   c) a display monitor within the vision of the driver to receive said light images through the transmitting means.

14. A driver observation system for use with a driver operated vehicle according to claim 13 where the transmitting means comprises at least one cable between the camera and display monitor.

15. A driver observation system for use with a driver operated vehicle according to claim 13 where the transmitting means comprises wireless communication between the camera and display monitor.

16. A driver observation system for use with a driver operated vehicle according to claim 13, where the right facing mirror and left facing mirror further comprises a pivotal mount and control means to rotate said side facing mirror to allow the camera to receive a light image not reflected from said mirror, and a display monitor within the vision of the driver to receive the light image not reflected from said mirror through the transmitting means.

17. A driver observation system for use with a driver operated vehicle according to claim 14, where the right facing mirror and left facing mirror further comprises a pivotal mount and control means to rotate said side facing mirror to allow the camera to receive a light image not reflected from said mirror, and a display monitor within the vision of the driver to receive the light image not reflected from said mirror through the transmitting means.

18. A driver observation system for use with a driver operated vehicle according to claim 15, where the right facing mirror and left facing mirror further comprises a pivotal mount and control means to rotate said side facing mirror to allow the camera to receive a light image not reflected from said mirror, and a display monitor within the vision of the driver to receive the light image not reflected from said mirror through the transmitting means.

* * * * *